United States Patent [19]

Gill

[11] Patent Number: 4,993,993
[45] Date of Patent: Feb. 19, 1991

[54] BELT TENSIONING APPARATUS

[75] Inventor: Hugh Gill, Livingston, Scotland

[73] Assignee: Unisys Corporation, Blue Bell, Pa.

[21] Appl. No.: 497,497

[22] Filed: Mar. 22, 1990

[30] Foreign Application Priority Data

Jun. 10, 1989 [GB] United Kingdom ............... 8913411

[51] Int. Cl.$^5$ .............................................. F16H 7/08
[52] U.S. Cl. ..................................... 474/111; 474/138
[58] Field of Search ............... 474/101, 109, 111, 113, 474/115, 117, 133–136, 138

[56] References Cited

U.S. PATENT DOCUMENTS

| | | | |
|---|---|---|---|
| 4,285,676 | 8/1981 | Kraft | 474/135 |
| 4,312,267 | 1/1982 | Shenberger | 100/179 |
| 4,458,403 | 7/1984 | Foster | 29/434 |
| 4,583,962 | 4/1986 | Bytzek et al. | 474/133 |
| 4,761,154 | 8/1988 | Beauchamp et al. | 474/101 |
| 4,767,385 | 8/1988 | Wilson | 474/138 |
| 4,816,011 | 3/1989 | Kotzab | 474/111 |

Primary Examiner—Thuy M. Bui
Attorney, Agent, or Firm—Whitham & Marhoefer

[57] ABSTRACT

The disclosure relates to a tensioning system for a drive belt (17). The system includes a tensioner (19) which is mounted to slide towards, and away from, the belt. An idler roller (22) is resiliently mounted in the tensioner (19) and is forced against the belt by means of springs, for example (84 and 85) in FIG. 8 or (102 and 103) in FIG. 9. The springs are arranged so that they increase the force applied by the roller to the belt as the tensioner is moved towards the belt until the force reaches a predetermined value, whereafter further movement over a limited range does ot further increase the force.

The invention provides a tensioning system which will provide a predetermined lateral pressure on the belt without the necessity for using measuring apparatus during the adjustment of the static belt tension.

13 Claims, 5 Drawing Sheets

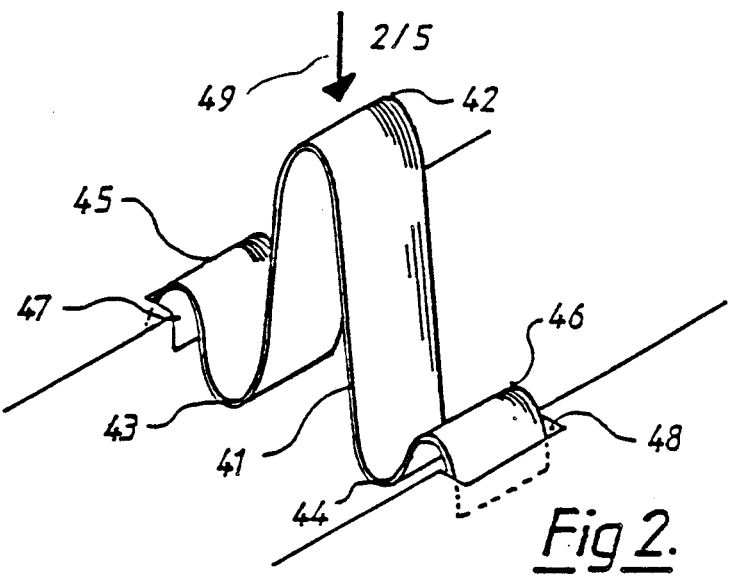
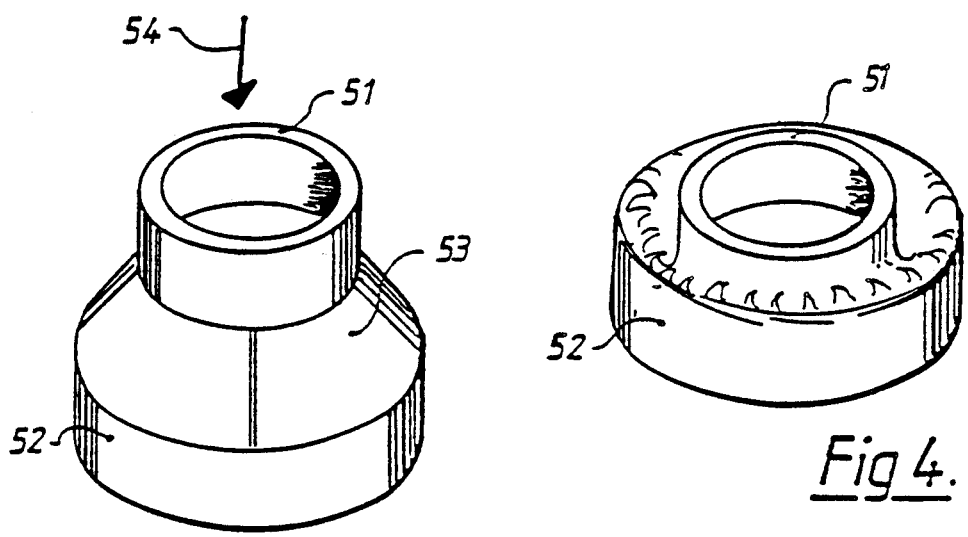
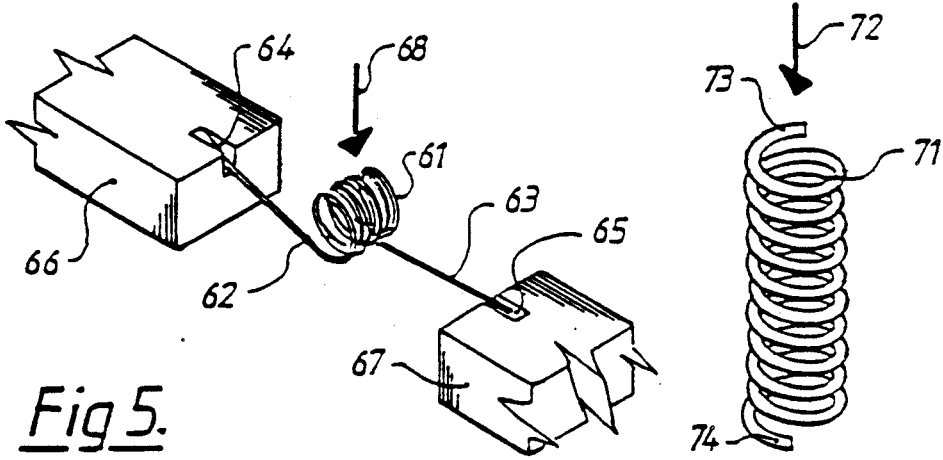

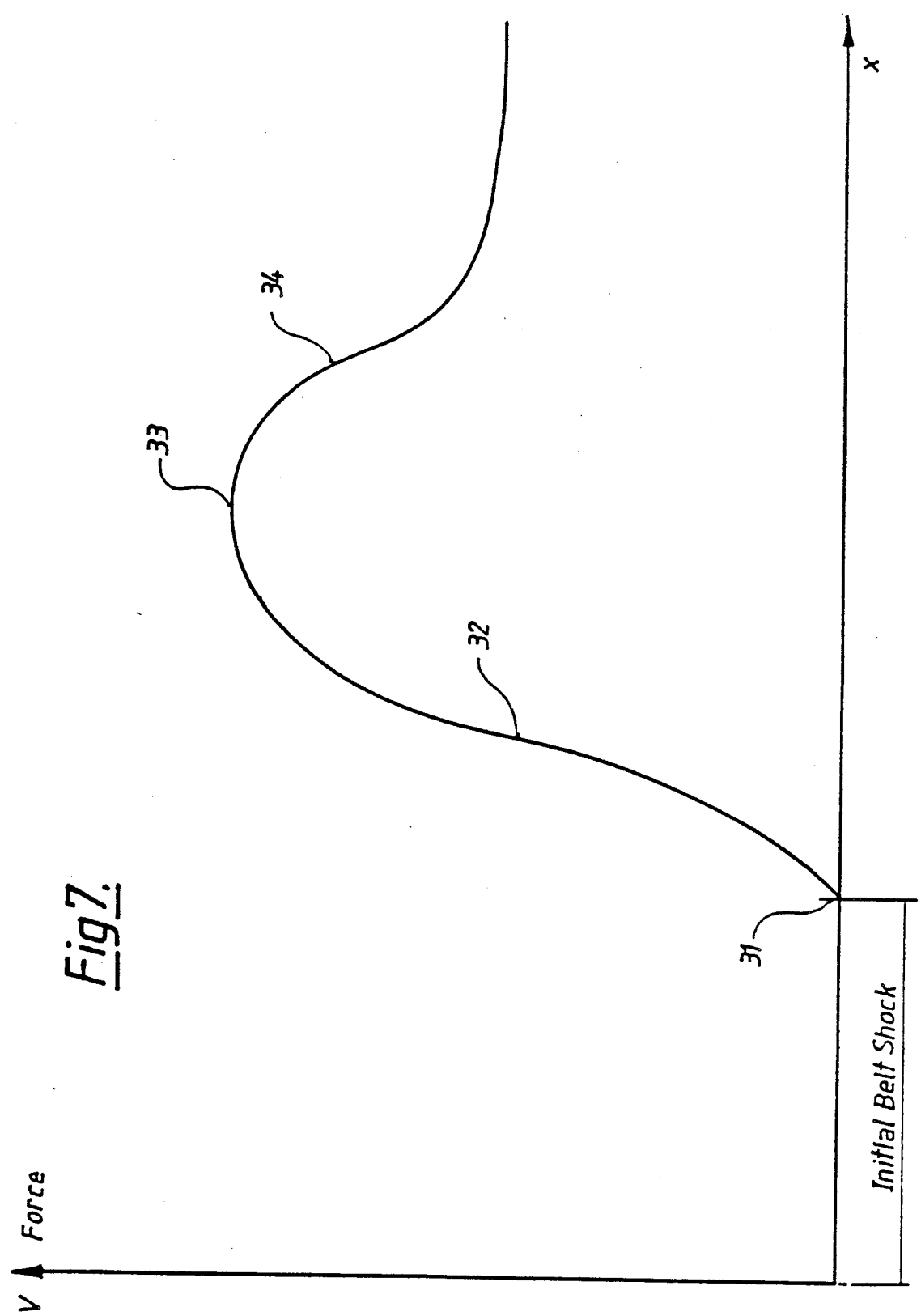

4,993,993

BELT TENSIONING APPARATUS

BACKGROUND OF THE INVENTION

1. Field of the Invention

This invention relates to a tensioning system for a drive belt passing around at least two pulleys.

2. Description of the Prior Art

It is well known to transmit drive from a motor or other live shaft to a further rotatable shaft by means of a belt and pulley system. The peripheries of the pulleys may be smooth, and in this case the inner side of the belt will also normally be smooth. However, when it is required that the driving and driven shafts should be synchronized, the peripheries of the pulleys may be toothed and in this case the inner surface of the belt will also be toothed to correspond.

The driving shaft may be used to transmit torque to a single driven shaft or it may be used to drive two or more shafts. In the latter case each driven shaft will be provided with a pulley and the belt will pass around all of the pulleys.

It is also well known that a belt drive system can only operate satisfactorily if the tension in the belt is maintained within certain limits. Thus, for example, if the belt is too tight, there will be unacceptable wear on the bearings of the various shafts, whereas, if the belt is too slack, slippage may occur between the driving and driven shaft or shafts. In an extreme case, if the belt is too slack, it may even become disengaged from one or more of the pulleys.

In order to maintain the required tension in the belt, the piece of apparatus supporting the bearing for one or more of the shafts may be mounted in such a way that the respective shaft may be moved towards, or away from, the other shaft or shafts. Where such an adjustable mounting is not practicable, an idler device comprising an idler pulley or idler bearing surface may be provided in the path of the belt between two of the pulleys.

Such an idler device will be adjustable in a direction normally at right angles to the undeflected path of the belt so that the total distance of the belt travel may be increased or decreased by movement of the idler device. If both surfaces of the belt are smooth, the idler device may be arranged to deflect the belt either inwardly or outwardly. However, when a toothed belt is used, it will normally be desirable to mount the idler device in such a way that it contacts the outer surface of the belt and may be used to deflect the belt inwardly. As already mentioned, the belt tension, when the belt and pulleys are stationary, must be adjusted accurately. For this purpose it is usual to make use of a force gauge during adjustment of the tensioning device. In a complicated piece of machinery it may be difficult to use a force gauge during the adjustment process and in many cases, even if it is practicable to use the force gauge under initial assembly conditions in a factory, it may not be practicable to use the gauge when adjustments are required outside the factory.

SUMMARY OF THE INVENTION

Accordingly it is an object of the present invention to provide a tensioning system which will provide a predetermined lateral pressure on the belt without the necessity for using measuring apparatus during the adjustment of the static belt tension.

In accordance with the invention the belt is deflected by means of a tensioning member which is mounted for movement towards, and away from, said belt, said member being urged towards said belt by spring means adapted to increase the force applied by the member to the belt as it is moved towards the belt until the force reached a predetermined value, whereafter further movement over a limited range does not further increase said force.

Preferably, the tensioning member is resiliently mounted in a housing which is movable towards, and away from, the belt. The resilient mounting of the tensioning member is designed in such a way as to provide the required characteristic of the force applied by the member to the belt.

The resilient mounting consists of, or includes, a spring which requires an increasing force to increase its deflection up to a predetermined limit. When this limit is reached, the deflection of the spring will increase over a predetermined range without any increase in the applied force. In other words, as an increasing deflecting force is applied to the spring, the deflection increases up to a predetermined limit, whereafter the spring collapses. Thus, a mechanic or user adjusting the tension in the belt will move the housing towards the belt and will feel the force required to move the housing increase up to a certain point at which resistance to movement will decrease. If the housing is locked in the position in which the resistance decreases, the correct lateral force will be applied to the belt.

BRIEF DESCRIPTION OF THE DRAWINGS

The foregoing and other objects, aspects and advantages will be better understood from the following detailed description of a preferred embodiment of the invention with reference to the drawings, in which:

FIG. 2 illustrates one form of spring for use in a system according to the invention;

FIGS. 3 and 4 illustrate a further suitable type of spring in the unstressed and collapsed states respectively;

FIGS. 5 and 6 illustrate two other forms of suitable spring;

FIG. 7 illustrates the characteristic required for a suitable spring;

DETAILED DESCRIPTION OF A PREFERRED EMBODIMENT OF THE INVENTION

Figure 1:
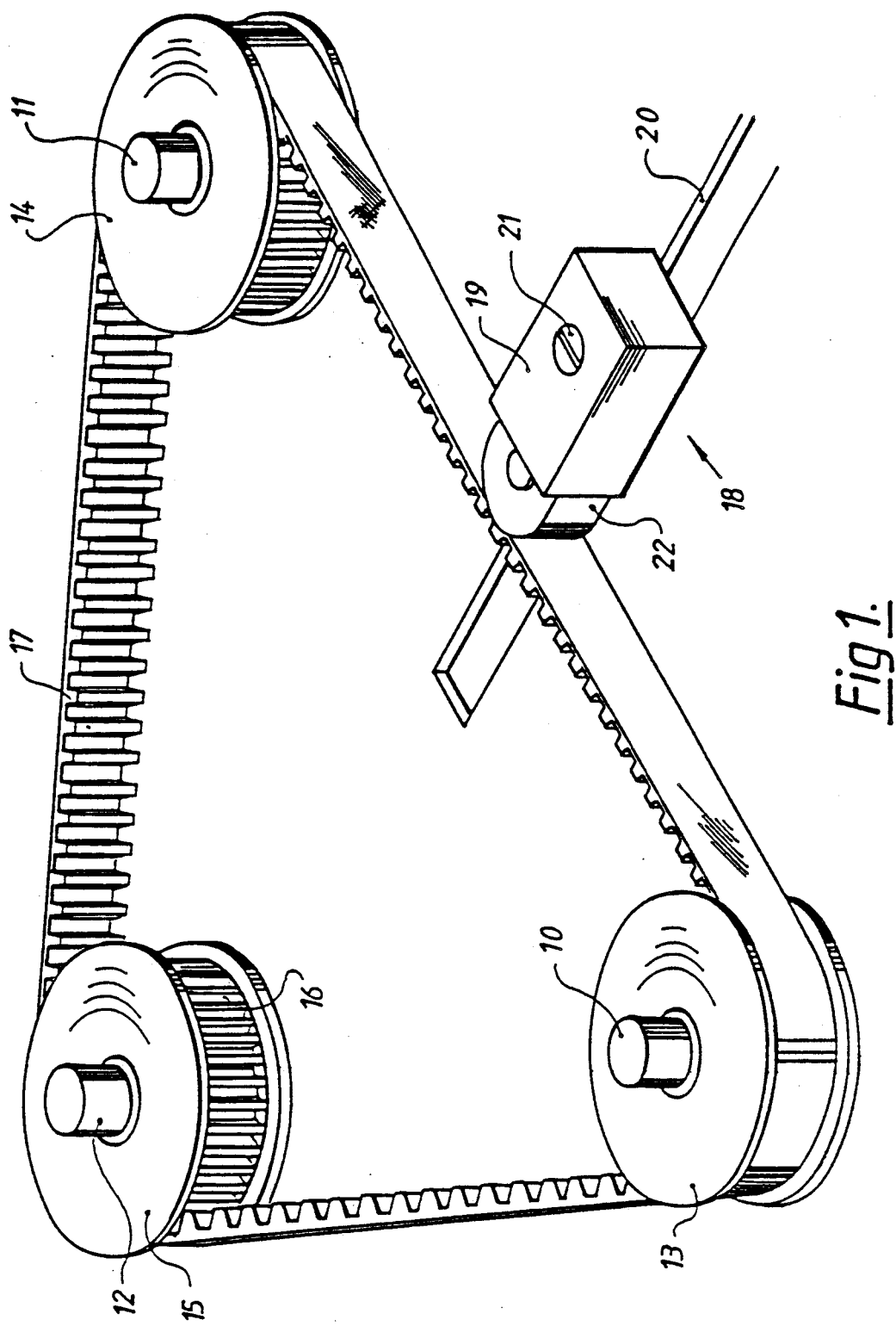
FIG. 1 illustrates a belt drive system including three pulleys and a tensioning device.

The apparatus illustrated in FIG. 1 includes a rotatable drive shaft 10 and two driven shafts 11 and 12. Mounted on the shaft 10 is a pulley 13, and pulleys 14 and 15 are mounted on the shafts 11 and 12 respectively. All the pulleys have teeth, for example as shown at 16, and are interconnected by means of a toothed belt 17. A tensioning device 18 is provided to enable the tension in the belt 17 to be adjusted to the required value.

The tensioning device 18 includes a housing 19 which is mounted for linear movement in a guideway 20. The housing 19 may be locked in any desired position in the guideway 20 by means of a locking screw 21. Mounted in the housing 19 is an idler roller 22. In a known system the axis of rotation of the idler roller 22 would be fixed in the housing 19. Thus in a known system, when it was required to adjust the tension in the belt 17, the screw 21 would be slackened to enable the housing 19 to slide freely in the guideway 20. The housing would then be pushed towards the belt and the force applied to the belt by the idler roller 22 would be measured by means of a force gauge. When the gauge indicated that the required force was being applied, the retaining screw 21 would be tightened. This arrangement would ensure that the tension in the belt was such as to give maximum belt and bearing life while preventing slip.

If a force gauge is not available to measure the force applied to the belt by the idler roller 22, the housing 19 may be locked in a position in which the belt tension is so high that the bearings are overloaded. Alternatively it may be locked in a position in which the force applied is so low that slippage can occur or the belt can even become disengaged from one of the pulleys.

A further drawback of the known system is that bearing life is reduced because the tensioning system is static rather than dynamic so that all of the force applied to the belt by the tensioning device is transferred to the shafts when the system is in operation. Ideally the bearings should be very lightly loaded, but with the known system loading has to be excessive in order to ensure that there is no slippage. Furthermore, when the drive system is running, the only damping in the drive to reduce shock loading is the stiffness of the belt. In a system in which the driven shafts must be accurately synchronized with the driving shaft, the stiffness of the belt has to be very high so that the shock loading on the shafts may also be high.

In a system in accordance with the invention, on the other hand, the axis of rotation of the idler 22 is resiliently movable in the housing 19. During adjustment of a system in accordance with the invention the locking screw 21 is again released and the housing 19 is pushed towards the drive belt. However, in this case no force is required since the housing is merely advanced until the force required to move it suddenly reduces. In many cases the point at which the reduction in force required occurs is accompanied by an audible click which makes it even easier for the operator to know the precise point at which the housing 19 should be locked by means of the screw 21 in the guideway 20.

The characteristic required of a spring for use in a system in accordance with the invention is illustrated in FIG. 7 in which the X axis indicates the movement of the housing 19 along the track 20 while the Y axis indicates the force applied by the idler roller 22 to the belt. As can be seen from FIG. 7, while the belt is slack, no force is applied by the idler roller 22 to the belt 17. However, when the housing reaches the point 31, the curve 32 shows that a force is applied to the belt. This increases as the housing is advanced towards the belt until it reaches a maximum at the point 33. Thereafter the force decreases as the housing is moved further along the slide. Thus, providing the housing is locked in position at some point on the downward slope 34 of the curve, the force applied to the belt will be within the required limits.

FIGS. 2-6 indicate various types of spring which are suitable for use in a system in accordance with the invention.

The spring 41, illustrated in FIG. 2, consists of a strip of resilient material folded to provide a peak 42, two troughs 43 and 44 and end portions 45 and 46. The end portions 45 and 46 are shaped to fit into slots 47 and 48 in a mounting. If an increasing force is applied to the peak 42 in the direction of the arrow 49, the shape of the spring will change so that the troughs 43 and 44 become deeper. This change of shape will be resisted by the resilience of the material, and the resistance will increase until the peak 42 has descended to a predetermined distance. At this point the resistance to deformation will start to decrease so that the spring characteristic follows the curve of FIG. 7 as required.

FIG. 3 illustrates a generally dome-shaped spring having an upper ring 51 and a base ring 52. These two rings are interconnected by a frusto-conical portion 53. If a force is applied to the upper ring 51 in the direction of the arrow 54, the portion 53 will be deformed and, as in the case of the spring illustrated in FIG. 2, this deformation will offer increasing resistance to the force applied to the ring 51. Once again after the ring 51 has descended towards the ring 52 until it reaches the position illustrated in FIG. 4, the portion 53 will collapse so that the force required to move the ring 51 further into the ring 52 will decrease. Once again, therefore, the spring characteristic has the general shape illustrated in FIG. 7.

In FIG. 5 a torsion spring 61 is shown with two arms 62 and 63. The ends of these arms are supported in slots 64 and 65 in a member, parts of which are shown at 66 and 67. If a force is applied to the coiled part of the torsion spring in the direction of the arrow 68, downward movement of the spring 61 will be resisted as the spring is wound more tightly. Initially this resistance will increase with downward movement of the coiled part of the spring. However, after a predetermined distance, further movement of the coiled spring will no longer increase the torsion in the spring so that once again the resistance to further movement will decrease.

Yet another example of a spring suitable for use in a system in accordance with the invention is shown in FIG. 6. In this case the spring is a simple helical compression spring 71. If a force is applied to the spring in the direction of the arrow 72 it will compress the spring and the force required to produce compression will increase. However, since the spring 71 is laterally unsupported, and is of relatively thin material, when the force applied reaches a predetermined limit, the spring will buckle so that the top of the spring 73 can be moved towards the bottom of the spring 74 without the application of any increased force.

Figure 8:
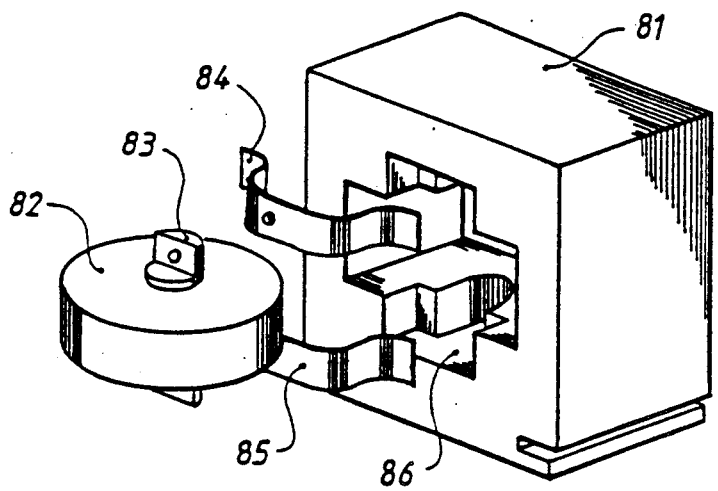
FIG. 8 is an exploded view of one assembly for use in a system according to the invention.

FIG. 8 illustrates an assembly for use in a system according to the invention, which assembly includes a housing 81 which is the equivalent to the housing 19 of FIG. 1 and an idler roller 82 which is the equivalent to the roller 22 of FIG. 1. The roller 82 is rotatable on an axle 83 which is secured by means of a rivet (not shown) at each end to respective springs 84 and 85. These springs are shaped somewhat on the lines of the spring shown in FIG. 2 so that, if they are supported at their ends, and a pressure is applied to their centers where the axle 83 is attached, they will collapse when the pressure reaches a predetermined value. As can be seen, the housing includes a space 86 shaped to receive the assembly of the two springs 84 and 85, the axle 83, and the idler roller 82. The interior of the space 86 includes supports for the two ends of the two springs 84 and 85 and also a cutout enabling the roller 82 and its axle 83 to move inwardly and outwardly in the space 86.

Figure 9:
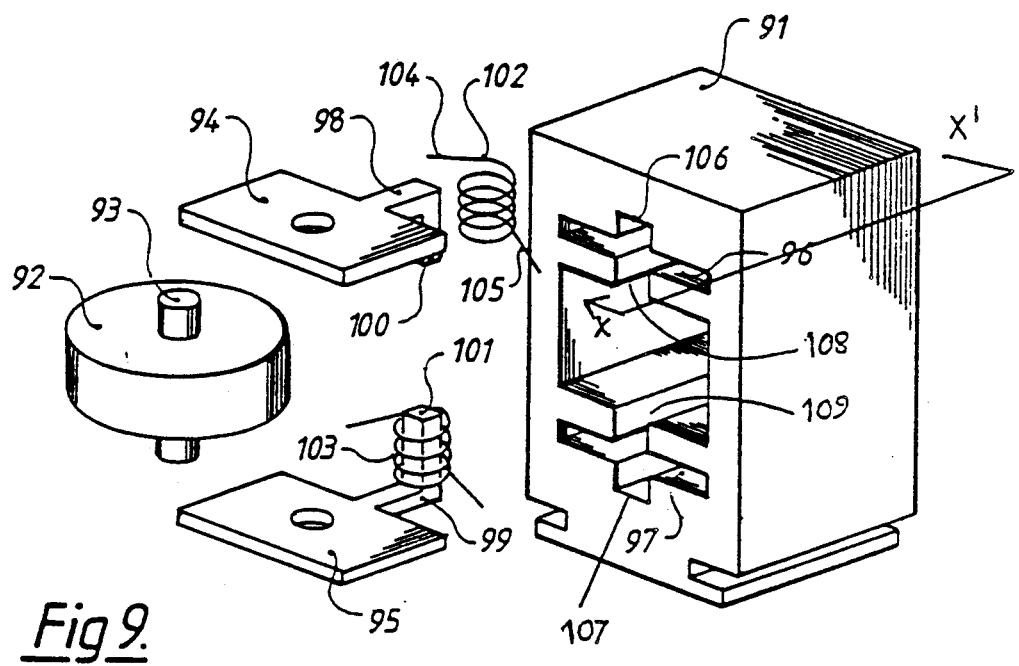
FIG. 9 is an exploded view of an alternative assembly for use in the system according to the invention.

FIG. 9 illustrates a further assembly generally similar to that of FIG. 8. Again the assembly includes a housing 91 and an idler roller 92. The idler roller is secured to an axle 93 which is rotatable in two bearing plates 94 and 95. These bearing plates are slidably mounted in slots 96 and 97 in the housing 91.

The two bearing plates 94 and 95 have rearward extensions 98 and 99 respectively and each of these extensions includes a spigot 100 or 101. Torsion springs 102 and 103 are mounted on the respective spigots 100 and 101. The two springs 102 and 103 are generally similar to the spring 61 shown in FIG. 5 and, for example, the spring 102 has end portions 104 and 105 extending generally radially from the helical portion of the spring. In the case of the plate 94, the extension 98 and the spigot 100 carrying the spring 102 are accommodated in a guideway 106 in the housing 91. The two ends 104 and 105 are located in the slot 96 which also accommodates the plate 94. Similar conditions apply to the plate 95 and the spring 103.

When the assembly of the idler roller, the plates and the springs is pushed into the housing, an increasing force is required to push it in until a certain point is reached. At this point the two springs collapse and the assembly can be pushed in further without any increase in the applied force.

Slots 108 and 109 accommodate the spigots 100 and 101. Further slots 106 and 107 accommodate the ends of the axle 93. The combination of the slots 108 and 109 and further slots 106 and 107 also accommodates the springs 102 and 103.

Figure 10:
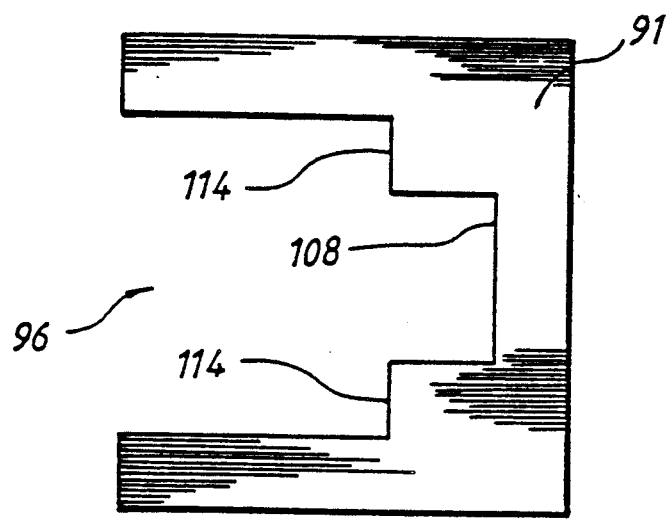
FIG. 10 is a cross-sectional view of FIG. 9 taken along the line X X looking in the direction of the arrows.

FIG. 10 is a cross-sectional view through the housing 91 of FIG. 9 along the line X X' looking in the direction of the arrows. FIG. 10 particularly illustrates a cross-section of the slot 96. It is to be understood that FIG. 10 is also representative of the cross-section of the slot 97. Within the slot 96 are provided platforms 114 for supporting the ends of the spring 102. The spigot 100 slides in a slot 108 which also accepts the spring 102. As the spring 102 collapses with its ends 104 and 105 held on the platforms 114, so it is accepted into the slot 108.

While the invention has been described in terms of a single preferred embodiment, those skilled in the art will recognize that the invention can be practiced with modification within the spirit and scope of the appended claims.

Having thus described my invention, what I claim as new and desire to secure by Letters Patent is as follows:

1. A tensioning system for a drive belt passing around at least two pulleys, comprising in combination;
    a tensioning member which is mounted in a housing which is movable toward and away from said drive belt in order to deflect said drive belt;
    said tensioning member being urged towards said drive belt by a spring action between said tensioning member and said housing, said spring requiring an increasing force to increase its deflection up to a predetermined limit, but which, when this limit is reached, can be deflected over a predetermined range without any further increase in the applied force;
    said spring adapted to increase the force applied by the member to the belt as it is moved towards the belt until the force reaches said predetermined limit, whereafter further movement over said predetermining range does not further increase said force.

2. A tensioning system according to claim 1, wherein said tensioning member is an idler roller fixed to an axle which is rotatable in a pair of guide plates slidable in a housing.

3. A tensioning system according to claim 2, wherein each of said guide plates is provided with a spigot on which is mounted a helical spring having two generally radially extending end portions which bear on said housing.

4. A tensioning system according to claim 1, wherein the tensioning member is an idler roller rotatably mounted on an axle which is secured to a pair of springs accommodated in a housing.

5. A tensioning system according to claim 4, wherein each of said springs comprises a generally flat central portion secured to said axle, two end portions contained in a plane substantially parallel to, but displaced from, the plane of said central portion, and two intermediate portions connecting said central portion to said two end portions and capable of collapsing when a predetermined force is applied between said central portion and said two end portions.

6. A tensioning system according to claim 1, wherein said spring means comprises a strip of resilient material folded to provide a central peak between two valleys and two end portions extending outwardly from said valleys away from said peak.

7. A tensioning system according to claim 6, wherein the end portions of said strip are supported in said housing and force is applied to an axle on which a drive roller is rotatable by said peak.

8. A tensioning system according to claim 1, wherein said spring means is designed to provide an audible sound when the force reaches said predetermined value.

9. A tensioning system according to claim 1, wherein said spring comprises two angular portions interconnected by a resilient frustoconical portion which collapses when a predetermined force is applied, urging one of said angular portions towards the other.

10. A tensioning system according to claim 1, wherein said spring comprises a helical spring having two end portions extending substantially radially, one from each end of the helical portion.

11. A tensioning system according to claim 10, wherein the end portions of said spring are supported in said housing and wherein a force is applied to an axle on which an idler roller is rotatable by the helical portion of said spring.

12. A tensioning system according to claim 1, wherein the spring means, is a laterally unsupported helical compression spring adapted to buckle when the applied force reaches a predetermined limit.

13. A tensioning system according to claim 12, wherein one end of said compression spring bears on said housing and the other end of said compression spring bears on an axle rotatably supporting said idler roller.

* * * * *